(12) United States Patent
Hong et al.

(10) Patent No.: US 7,906,074 B2
(45) Date of Patent: Mar. 15, 2011

(54) MICROFLUIDIC ARRAY SYSTEM FOR BIOLOGICAL, CHEMICAL, AND BIOCHEMICAL ASSESSMENTS

(75) Inventors: Jong Wook Hong, Auburn, AL (US); Jihyun F. Kim, Yuseong-gu (KR); Tae Kwang Oh, Yuseong-gu (KR); Sung Ho Yoon, Yuseong-gu (KR)

(73) Assignee: Auburn University, Auburn, AL (US)

( * ) Notice: Subject to any disclaimer, the term of this patent is extended or adjusted under 35 U.S.C. 154(b) by 392 days.

(21) Appl. No.: 12/100,209

(22) Filed: Apr. 9, 2008

(65) Prior Publication Data

US 2008/0248960 A1    Oct. 9, 2008

Related U.S. Application Data

(60) Provisional application No. 60/922,428, filed on Apr. 9, 2007.

(51) Int. Cl.
*B01L 3/02* (2006.01)
*B01L 99/00* (2010.01)
*G01N 15/06* (2006.01)

(52) U.S. Cl. ........... 422/100; 422/68.1; 422/81; 422/82; 422/103; 436/43; 436/180; 251/129.01; 251/142; 251/213

(58) Field of Classification Search .................. 422/100, 422/68.1, 81, 82, 103; 436/43, 180; 251/129.01, 251/142, 213
See application file for complete search history.

(56) References Cited

U.S. PATENT DOCUMENTS

| | | | |
|---|---|---|---|
| 6,619,311 B2 * | 9/2003 | O'Connor et al. | 137/109 |
| 7,027,683 B2 * | 4/2006 | O'Connor et al. | 385/19 |
| 2001/0029983 A1 * | 10/2001 | Unger et al. | 137/597 |
| 2002/0166585 A1 | 11/2002 | O'Connor et al. | |
| 2007/0166199 A1 | 7/2007 | Zhou et al. | |
| 2008/0004753 A1 | 1/2008 | Hong et al. | |

FOREIGN PATENT DOCUMENTS

| | | |
|---|---|---|
| WO | WO 03/089138 | 10/2003 |
| WO | WO 2004/040001 | 5/2004 |
| WO | WO 2005/030822 | 4/2005 |
| WO | WO 2007/033385 | 3/2007 |
| WO | WO 2008/016703 | 2/2008 |

* cited by examiner

*Primary Examiner* — Brian J Sines
(74) *Attorney, Agent, or Firm* — Andrus, Sceales, Starke & Sawall, LLP

(57) ABSTRACT

The system and method of the present application is a microfluidic array system for biological, chemical and biochemical assessments including a microfluidic chip for reaction assays, wherein the microfluidic chip includes a control layer and a fluidic layer, wherein the control layer is pressurized through pneumatic or hydraulic means in order to control the flow of the reagents in the fluidic layer. The system and method of the present application further includes a method of fabricating such a microfluidic chip, and further a method for operating the same. Lastly, the system and method of the present application further includes a system for operating and analyzing the microfluidic array including a pressure source, a fluidic source, a biochip reader, and a processor configured to control the same.

13 Claims, 8 Drawing Sheets

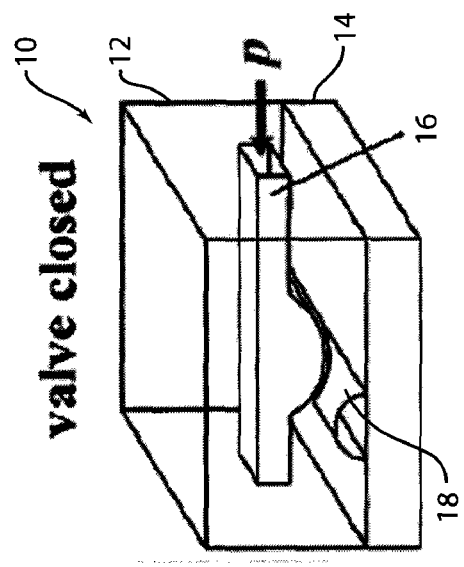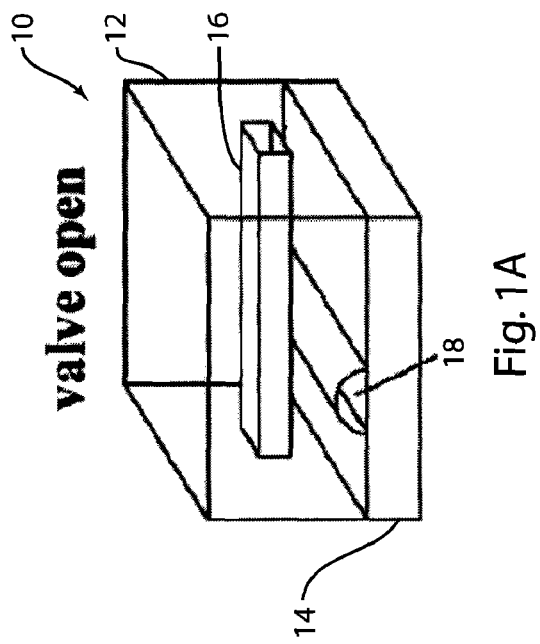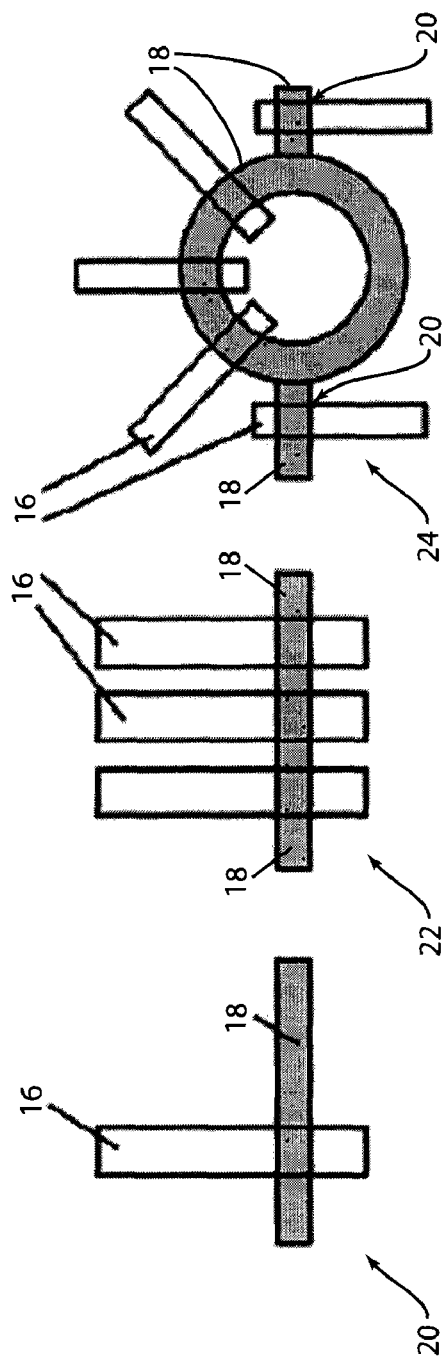
Fig. 1A Fig. 1B Fig. 1C Fig. 1D Fig. 1E

E. coli K-12 W3110 in glucose (0.04%)/lactose (0.2%)

***lac* Z knock-out mutant in glucose (0.04%)/lactose (0.2%)**

MICROFLUIDIC ARRAY SYSTEM FOR BIOLOGICAL, CHEMICAL, AND BIOCHEMICAL ASSESSMENTS

CROSS-REFERENCE TO RELATED APPLICATIONS

This application claims priority to Provisional Application Ser. No. 60/922,428, filed Apr. 9, 2007.

FIELD OF THE DISCLOSURE

The disclosure relates to the field of biological, chemical and/or biochemical assessments including systems for and methods of performing such assessments. More particularly, the disclosure relates to the field of microfluidic systems and their utility in biological, chemical, and biochemical assessments.

BACKGROUND OF THE DISCLOSURE

Biological chemical and/or biochemical assessments are carried out daily in diverse arenas such as universities and industry. For example, phenotype assessment is critical to trace the metabolic abilities of certain bacteria and fungi as well as mammalian cells. However, current technologies for such assessments are generally restricted to using gene chips or micro titer plates. These current methods have critical limitation of requiring huge sample volumes of several tens or hundreds milliliters for the assessments. Moreover, expensive robotic systems are often required to handle samples.

In the last two decades, thousands of microfluidic components have been developed to explore the potential benefits of microfluidic systems over conventional systems, including reduction of reagent volumes, fast response times, well-controlled reaction condition, parallel processing, etc. However, there are limited numbers of reports on microfluidic platforms conducting a service of biological processes on a single microfluidic device.

SUMMARY OF THE DISCLOSURE

The system and method of the present application is a fluidic array system for performing biological, chemical and/or biochemical assessments, including a microfluidic chip for reaction assays, wherein the microfluidic chip includes a control layer and a fluidic layer, and wherein the control layer is pressurized through pneumatic or hydraulic means in order to control the flow of the reagents in the fluidic layer. The system and method of the present application further includes a method of fabricating such a microfluidic chip, and further a method for operating the same. Lastly, the system and method of the present application further includes a system for operating and analyzing the microfluidic array including a pressure source, a fluidic source, a biochip reader, and a processor configured to control the same.

One aspect of the present invention is a microfluidic array chip for biological, chemical, or biochemical assessments having a plurality of layers, the microfluidic array chip comprising a fluidic layer comprising a plurality of fluid flow channels for delivery of selected reagents or samples, the fluid flow channels coupled to a chamber array, the chamber array comprising a plurality of reaction chambers; a control layer comprising a plurality of control channels; wherein the fluidic layer and the control layer are coupled together such that the plurality of control channels form a valve system for the plurality of the fluid flow channels.

Another aspect of the present invention is a method of fabricating a multi-layer liquid microarray chip, the method comprises masking each of a plurality of layers of the multi-layer liquid array chip according to a predetermined design; producing a first layer including a plurality of fluid flow channels; producing a second layer including a plurality of control channels; curing separately each of the first and second layers; aligning the first and second layers; and curing the first and second layers together, wherein the second curing step physically couples the first and second layers together.

Yet another aspect of the present invention is a system for operating and analyzing a microfluidic array, the system comprises a multi-layered chip, the multi-layered chip including: a first layer having a plurality of fluid flow channels; and a second layer having a plurality of control channels, wherein the plurality of control channels are valves with a plurality of fluid flow channels; a pressure source coupled to the plurality of control channels, wherein when the pressure source provides pressure to any of the plurality of control channels, the plurality of control channels under pressure close, thus preventing fluid flow in the plurality of fluid flow channels controlled by the plurality of control channels under pressure; at least one fluidic source, the fluidic source including a set of reagents or samples for mixing in a plurality of reaction chambers; a biochip reader configured to read the plurality of reaction chambers after the set of reagents are mixed; and a processor coupled to the pressure source, the at least one fluidic source, and the biochip reader, such that the processor is configured to control the operation of the mixing and analyzing of the reagents by controlling the pressure source, the at least one fluidic source, and the biochip reader.

Another aspect of the present invention is a microfluidic array chip for biological, chemical, or biochemical assessments having a plurality of layers, the microfluidic array chip comprises a fluidic layer comprising a plurality of fluid flow channels for delivery of selected reagents or samples, the fluid flow channels coupled to a chamber array, the chamber array comprising a plurality of reaction chambers; a piezoelectric layer comprising a plurality of micro mechanical valves; wherein the fluidic layer and the piezoelectric layer are coupled together such that the plurality of micro mechanical valves form a valve system for the plurality of the fluid flow channels, and further wherein a piezoelectric controller applies an electric current to the piezoelectric layer to operate the plurality of micro mechanical valves.

A final aspect of the present invention is a method of conducting a biological, chemical, or biochemical assessment with a microfluidic array chip having a plurality of layers, the method comprising: delivering a set of selected reagents or samples, with a fluidic layer comprising a plurality of fluid flow channels the fluid flow channels coupled to a chamber array, the chamber array comprising a plurality of reaction chambers, wherein the fluidic layer and the control layer are coupled together such that the plurality of control channels form a valve system for the plurality of the fluid flow channels; a pair of side valves to allow the set of reagents or samples into a pair of delivery chambers when the side valves are open, wherein the side valves are each one of a plurality of control channels in a control layer comprising a plurality of reaction chambers; configuring a center valve to separate the pair of delivery chambers when the center valve is closed, wherein the center valve is one of the plurality of control channels; delivering the set of reagents or samples to the pair of delivery chambers by a pair of delivery channels, further wherein the delivery channels are each one of the plurality of fluid flow channels; and mixing the set of reagents or samples in each pair of delivery chambers when the pair of side valves are closed and the center valve is opened.

BRIEF DESCRIPTION OF THE DRAWINGS

FIGS. 1a-1e illustrate a graphical representation of fluid and control channels according to an embodiment of the present application.

DETAILED DESCRIPTION

Figure 2:
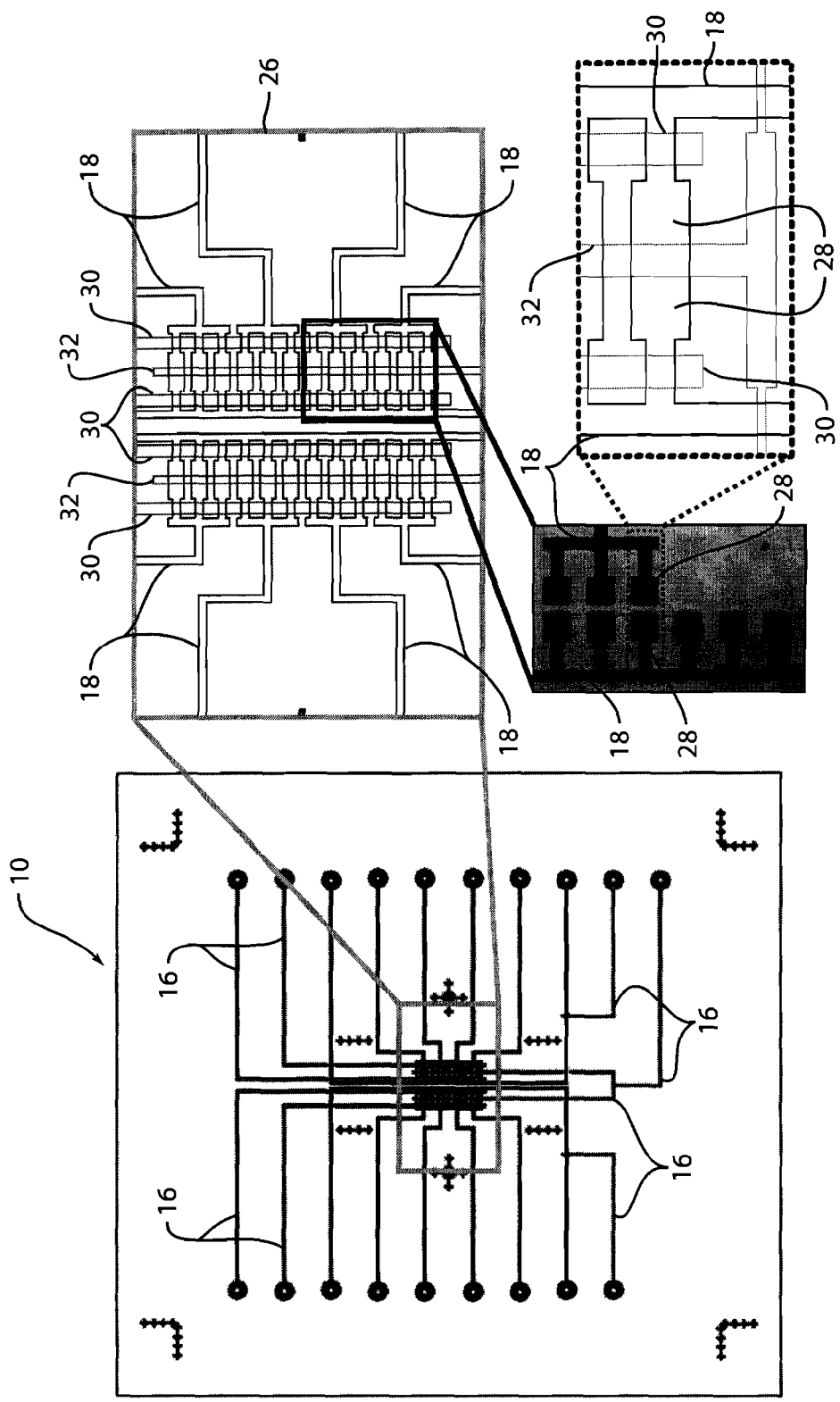
FIG. 2 illustrates a schematic view of a microfluidic array chip according to an embodiment of the present application.

FIGS. 1a and 1b illustrate a three-dimensional cross section of a microfluidic array chip 10 of an embodiment of the present application. The microfluidic array chip 10 includes a control layer 12 including a plurality of control channels 16, and the fluid layer 14 that includes a plurality of fluid flow channels 18. The control layer 12 and the fluid layer 14 are coupled together such that one microfluidic array chip 10 is formed, while the plurality of control channels 16 and the plurality of fluid flow channels 18 are in close proximity to one another such that the control channel 16 act as a series of valves or a valve system for the plurality of fluid flow channels 18.

Referring first to FIG. 1a, an example of an open valve state of a fluid flow channel 18 is depicted. Here, the fluid flow channel 18 in the fluid layer 14 is open and able to transport a reagent or sample to a reaction chamber. The control channel 16 in the control layer 12 is currently not under pressure, and thus not applying pressure to the fluid flow channel, resultingly allowing the fluid flow channel to be opened. It should be noted that the control channel 16 in the control layer 12 may be configured such that when the control layer 12 and fluid layer 14 are coupled together, that the control channel may or may not be in contact with the fluid flow channel 18. What is more important is that when pressure is applied to the control channel 16, that the fluid flow channel 18 is closed.

Such an instance is illustrated in FIG. 1b. Here, again the fluidic array chip 10 includes a control layer 12 having a control channel 16, and a fluid layer 14 having a fluid flow channel 18. In this case, however, a pressure p is applied to the control channel 16, thus widening the control channel 16 and closing the fluid flow channel 18. Again, it is not important whether the control channel 16 was in contact with the fluid flow channel 18 prior to the pressure p being placed on the control channel 16, but that the control channel 16 has sufficient pressure p to expand and thus close the fluid flow channel 18. The pressure p may be administered to the control channels 16 through any pressure type system known in the art. Depending upon the application, a pneumatic or hydraulic system for instance could be used to apply the pressure p.

FIGS. 1c-1e illustrate a number of combinations of control channels 16 and fluid flow channels 18 designed for a specific purpose. First referring to FIG. 1c, a valve 20 is depicted as the control channel 16 turns on or off the fluid channel 18. This example of FIG. 1c is basically a simplistic recreation of the three dimensional valve representation from FIGS. 1a and 1b.

FIG. 1d illustrates a simple pump configuration including a plurality of control channels 16 and a simple fluid flow channel 18. Here, the control channel 16 may receive pressure p from either direction in succession in order to move fluid through the fluid flow channel 18. In other words, in order to move an amount of fluid in the fluid flow channel 18 from right to left, first all of the control channels 16 would be switched to a closed position by applying a pressure to all three control channels 16. Then, the right most control channel would be opened, allowing fluid to flow to the middle control channel 16. Then, the right most control channel 16 would be closed and the middle control channel 16 would be opened allowing the fluid trapped between the right most control channel 16 and the middle control channel 16 to pass to the left most closed control channel 16. Lastly, the middle control channel 16 would be closed and the left most control channel 16 would be opened, allow the predetermined amount of liquid to flow from the fluid flow channel 18 before the left most control channel 16 would be closed again. Repeating this aforementioned process would pump an amount of fluid through the fluid flow channel at a specified rate.

Referring now to FIG. 1e, and combining the valve 20 from FIG. 1c, and the pump 22 from FIG. 1d, a mixer 24 is configured by configuring two valves 20 on either side of a circular fluid flow channel 18 and three control channels 16 in a pump 22 configuration. Here, an operator of the system may open each or either of the end control channels 16 in order to allow two different fluids to flow in the circular fluid flow channel. Then, the three control channels 16 making up the pump configuration 22 could open and close in succession in order to mix the two fluids together.

Figure 4:
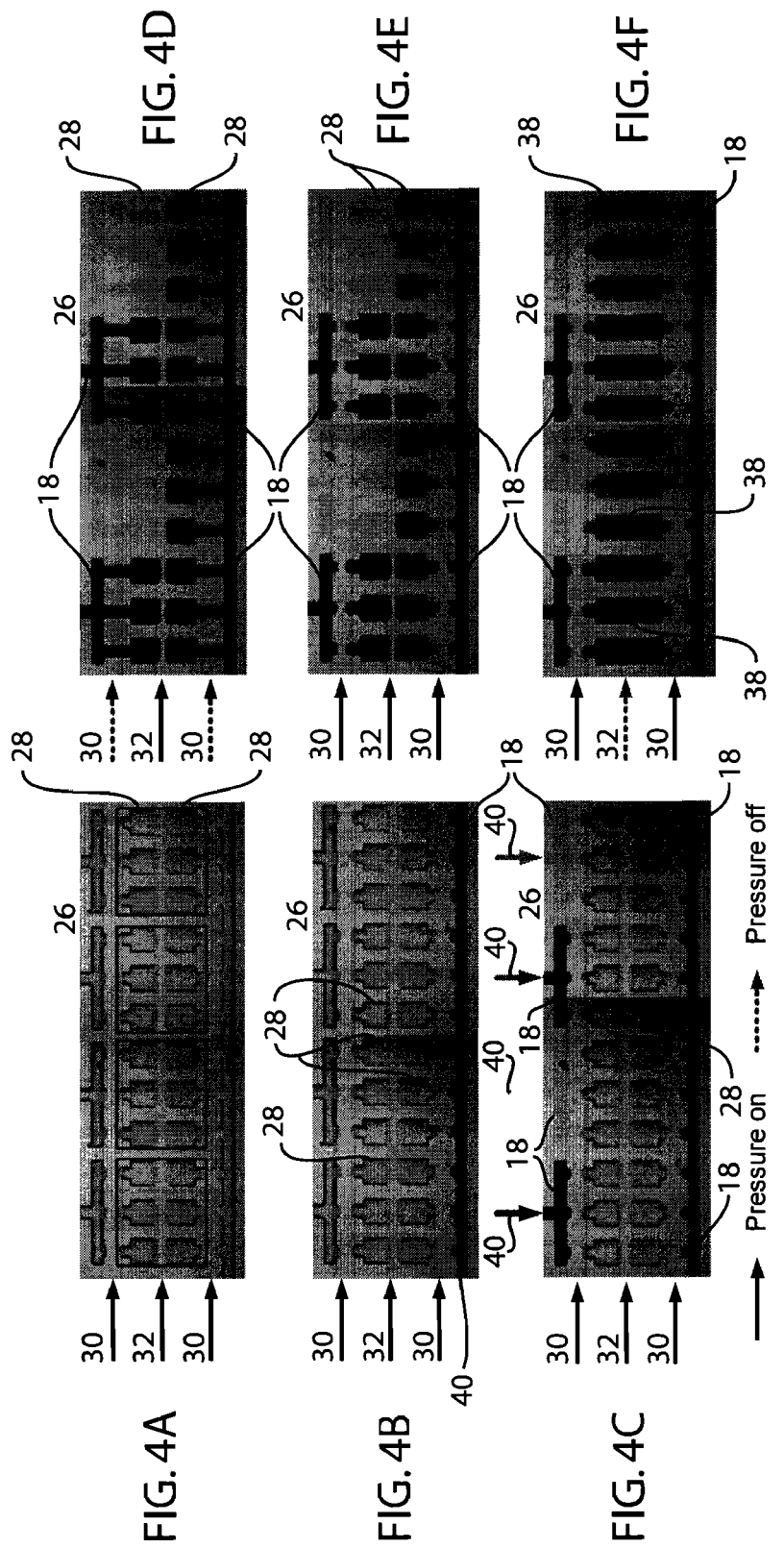
FIGS. 4a-4f illustrate a reaction chamber array of the microfluidic array chip for conducting a biological, chemical and biochemical assessment according to an embodiment of the present application.

Referring now to FIG. 2, a top view of a fluidic array chip 10 is depicted. Here, a magnified view of the reaction chamber array 26 is further provided to further illustrate the function of the fluidic array chip 10. Referring to the reaction chamber array 26, a plurality of fluid flow channels 18, flowing to a plurality of delivery chambers 28 is depicted, as well as a plurality of control channels 16, also labeled as side valve 30 and center valves 32 where appropriate. The further magnifications show with even more detail the fluid flow channels 18 configured to deliver reagents and/or samples into a delivery chamber 28, while the side valves 30 and center valve 32 control the delivery of the reagents and/or samples to the delivery chambers 28, and finally control the mixing of pairs of delivery chambers 28 into a reaction chamber 38 (not shown). The fluidic array chip 10 of the application is configured to include 10-10,000 reaction chambers 38 per square inch. As can be seen in the final magnification in FIG. 2, a center valve 32, when pressure is applied, splits a reaction chamber 38 (not shown) into two delivery chambers 28. When the side valves 30 are opened, reagents and/or samples in the fluid flow channels 18 flow into the delivery chambers 28, but do not combine as the center valve 32 is closed. To perform a reaction, the side valves 30 are closed, and the center valve 32 is opened such that the reagents in the pairs of delivery chambers 28 are mixed. A more detailed description of the reaction process will be shown in the discussion of FIG. 4.

Referring back to FIG. 1, it is also contemplated that the control layer 12, in an additional embodiment, can also be constructed from a piezeoelectric material and include a set of mechanical microvalves in lieu of the plurality of control channels 16. In this embodiment, the piezeoelectric material would be coupled with the PC 310 in FIG. 7, wherein a separate control system (not shown) for piezeoelectric control layer would be implemented, thus allowing the set of mechanical microvalves to be controlled by providing an electric current to the piezeoelectric material in specified areas to close or open predetermined mechanical microvalves.

Figure 3:
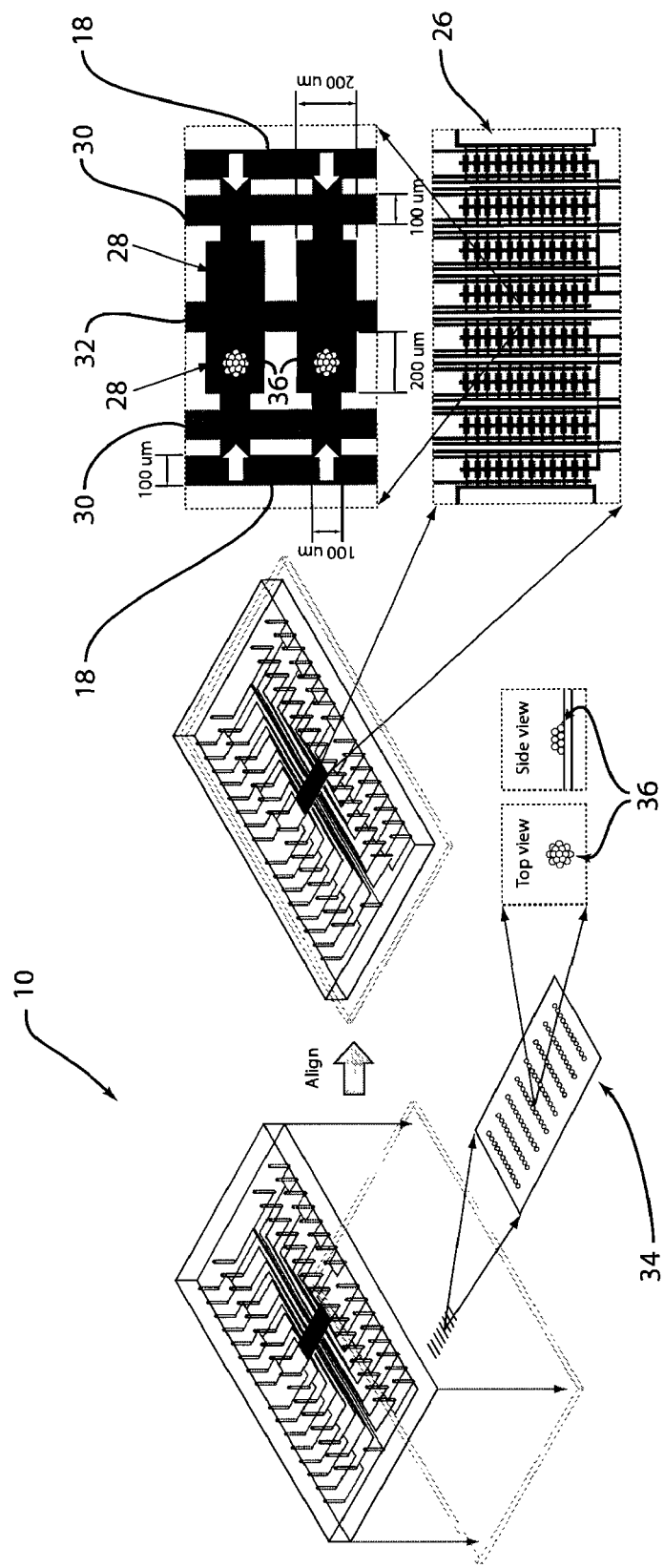
FIG. 3 illustrates a graphical representation of a microfluidic array chip according to an embodiment of the present application.

Referring now to FIG. 3, a further embodiment including a third layer is depicted. Here, a fixed biological, biochemical or chemical layer 34 is added as a third layer to the fluidic array chip 10 being coupled to the underside of the fluid layer 14. The fixed layer 34 includes a number of biological, chemical or biochemical samples 36 that are bound to fixed layer 34 and that may be aligned with the delivery chambers 28 according to a particular desired experiment. The samples 36 are introduced into the delivery chambers 28 through premade openings in the delivery chambers 28, preferably on the underside of the delivery chambers 28. The fixed layer 34 is aligned with the openings in the delivery chambers 28 and is bound, in one embodiment through covalent bonding, to the underside of the fluid layer 14 such that the pre-made openings in the delivery chambers 28 are sealed with the fixed samples 36 in the delivery chambers 28. Other methods of affixing biological, biochemical or chemical molecules to a substitute are well known in the art and are intended as being within the scope of the present disclosure.

Still referring to FIG. 3, again the reaction chamber array 26 includes a plurality of the delivery chambers 28, fluid flow channels 18, and control channels 16, more specific labeled here as a center valve 32 and a pair of side valves 30. Thus, when a reagent delivery chamber 28, it is in reactive contact with fixed layer 34. It should be noted that this magnified portion of the reaction chamber array 26 includes dimensions for the fluid flow channels 18 as well as for the delivery chambers 28. It should be noted that these values may vary according to the size of the chip, and the necessity for larger volumes of reagents for certain reactions.

Referring now to FIGS. 4a-4f, a progression of filling a reaction chamber array 26 with reagents or samples and conducting reactions is illustrated in order from FIG. 4a-4f. In FIG. 4a, the reaction chamber array 26 is empty of reagents or samples, and a plurality of delivery chambers 28 are empty and waiting for the introduction of reagents or samples. The center valve 32 and the two side valves 30 are under pressure, and are therefore closed. In FIG. 4b, a first reagent or sample 40 is added to the bottom fluid flow channel 18, and the closed state of the nearest side channel 30 prevents the reagent or sample 40 from entering the delivery chambers 28. In FIG. 4c, pressure is still applied to the side valves 30 and the center valve 32, and a second reagent or sample 40 is added to the top most fluid flow channels 18. Again, because both side valves 30 are under pressure, the valves are closed and the reagent or sample 40 cannot enter the delivery chambers 28.

Referring now to FIG. 4d, pressure is taken off of the side valves 30 and the reagent or sample 40 in each of the fluid flow channels 18 are allowed to enter the delivery chambers 28. It should be noted that at this stage, the center valve 32 is still under pressure, and therefore the regents or samples 40 in the delivery chambers 28 are not mixed. In FIG. 4e pressure is reapplied to the side valves 30 such that the reagents or samples 40 are now enclosed in the delivery chambers 28. Still, the pressure has never been removed from the center valve 32, such that the reagents or samples 40 and the delivery chambers 28 has not been mixed. Finally, in FIG. 4f, pressure is removed from the center valve 32, but remains on the side valves 30, such that the reagents in the delivery chambers 28 mix in a combined reaction chamber 38. Subsequently, the reaction chamber array 26 can be examined and interpreted, as will be discussed in the further specification.

The first and second reagents or samples 40 may include any substance used to produce a biological, chemical, or biochemical reaction such that a measurement or detection of an interaction between the first and second reagents or samples 40 may be made. It is contemplated that the present application will be applicable to eukaryotic samples such as yeasts and mammalian cells, and particular application is contemplated for eukaryotic stem cells. However, the application is not limited by the above and use with prokaryotic applications is also contemplated. Accordingly, first and second reagents or samples 40 may include, but are not limited to the following: eukaryotic cells, prokaryotic cells and partially the foregoing cells in liquid suspension or of use arranged for fluidic delivery; DNA and RNA, including cDNA, chimeric DNA, recombinant DNA, and other known nucleotides that may be denatured and suspended or otherwise arranged for fluidic delivery; polymerase or other selected enzymes; macromolecules such as proteins, carbohydrates or lipids and constituent molecules thereof; buffers; stimulants; control liquids; and other reagents or samples that one of skill in the art may desire to include in a biological, chemical or biochemical reaction or assessment. In one embodiment, the present application may be used for chemical and biochemical analysis involving drug screening and/or personalized medicine design.

Figure 5:
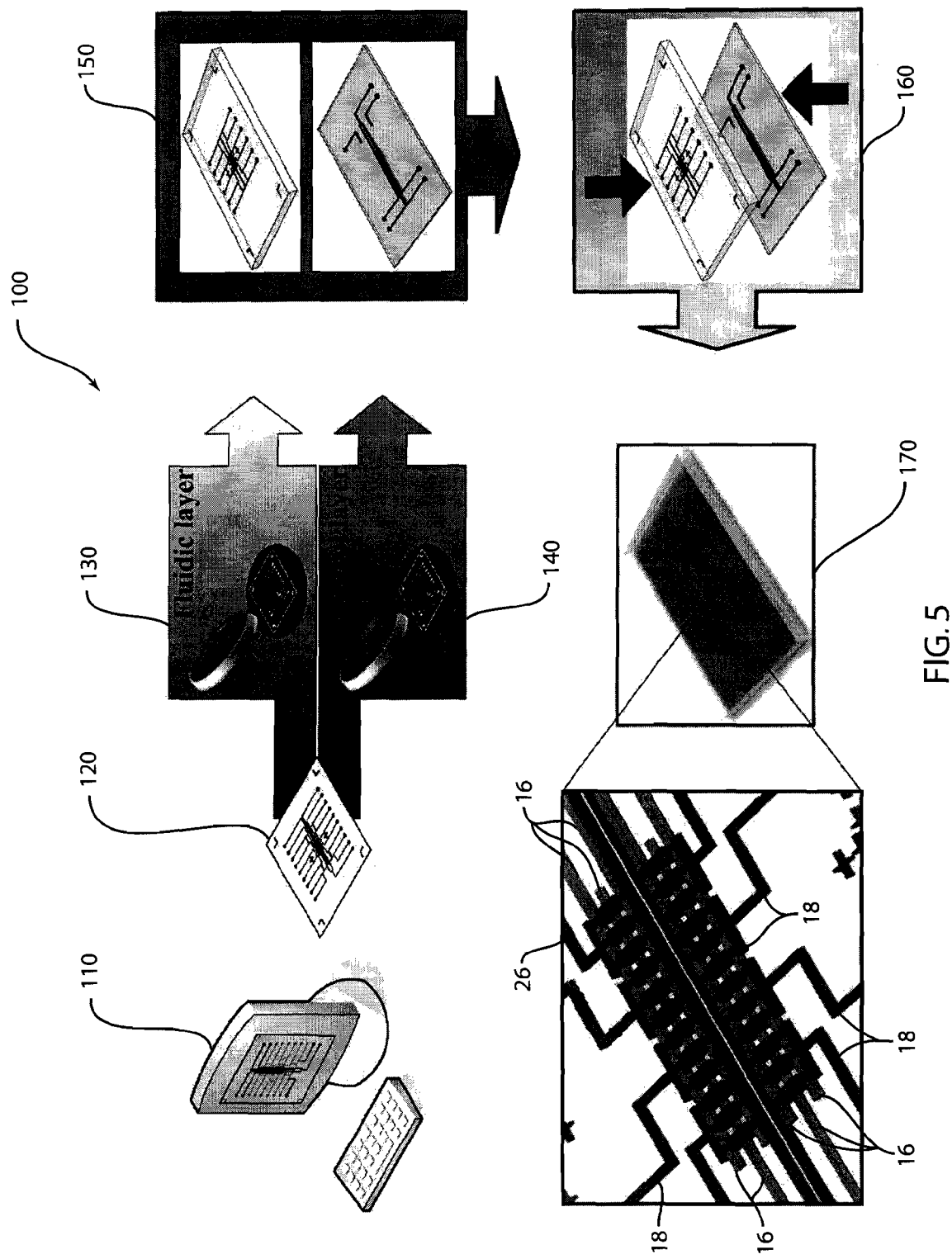
FIG. 5 illustrates a flow chart of a fabrication method according to an embodiment of the present application.

Referring now to FIG. 5, a process of fabricating such a fluidic array chip 10 is shown. Here, the fabrication method 100 first starts in step 1 10. The design step 110 includes utilizing known chip design methods to allow a user to design the fluid layer and the control layer of the fluidic array chip. Such a design step may use CAD design software or other chip design software, but is not limited to the same. The design step 110 will include designing both the fluid layer and the control layer separately, and also include combining them to work as a system. In step 120, a mask of the fluidic array chip design, including a mask of both the fluid layer and the control layer is generated. In step 130 and 140, the fluidic layer and the control layer are separately molded. This molding of each of the layers may be achieved through pore molding, injection molding, or a laminating process, or other methods known in the art. The particular type of molding utilized to form each of the fluidic control layers may be dependant upon the type of material used to construct these layers. These layers may be constructed from a silicon polymer, a teflon polymer, or a perfluoropolyether, or any material that may be molded such that a control layer under pressure is flexible and able to act as a valve for a similarly flexible fluid layer. In step 150, each of the molded layers are cured in order to allow the layers to set after molding. In step 160, the layers are aligned such that the control layer is properly configured on the fluid layer to control the movement of the reagents or samples through the fluid flow channels of the fluid layer. Lastly, in step 170, the two layers are cured together and the fluidic array chip is formed. Another view of the reaction chamber array 26 indicates that the control channels 16 are properly configured to act as valve for the fluid flow channels 18.

As discussed with respect to the additional embodiment of FIG. 1, the system of FIG. 5 may include a control layer being constructed from a piezoelectric material and having mechanical microvalves in lieu of the plurality of control channels, this layer may be fabricated using the above fabrication method 100, but without the need to design and mask a plurality of control channels. Instead, the configuration of the piezoelectric material with respect to the mechanical microvalves would meet the design and mask before the piezoelectric material would be formed as described above in the description of FIG. 5.

Figure 6:
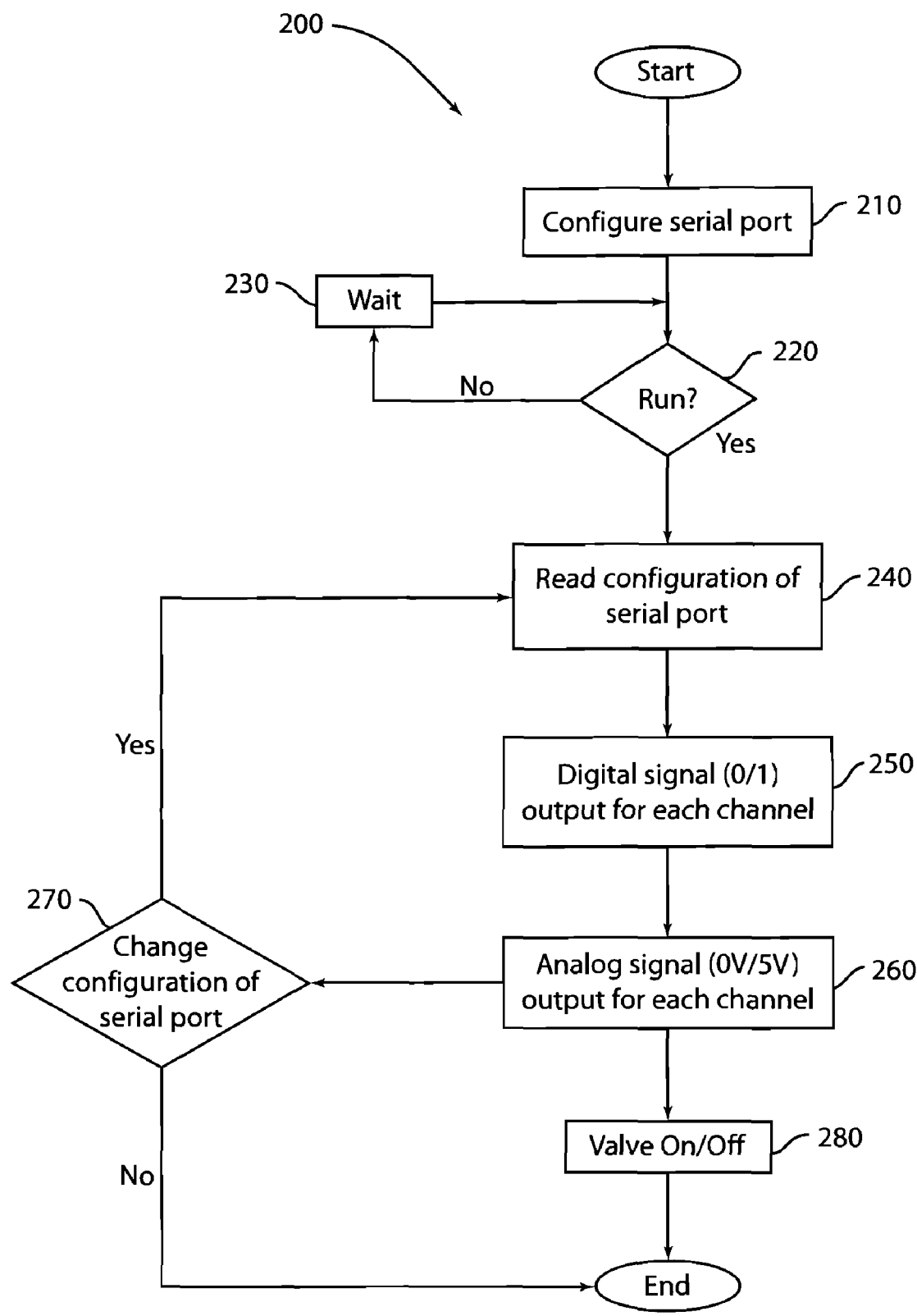
FIG. 6 illustrates a flow chart of an operation method according to an embodiment of the present application.

Referring now to FIG. 6, a method 200 of the operation of the control valve system is depicted. First in step 210, a serial port is configured. In this step a user is able to configure the serial port by entering the number of valves to be switched, and any other order or pattern of switching of those valves as well. In step 220, it is determined whether to run the control valve system, and if not then the method 200 waits in step 230, and when it is appropriate for the system to run, then the method 200 proceeds to step 240. In the first step of the system run in 240, the serial port configuration is read. This allows the control valve system to determine how many and which particular valves to open or close first. After the serial port configuration is read in 240, a digital signal is output to the controlled for each channel read in step 250. It should be noted that the serial port can be configured such that a zero digital signal means open or close, and likewise that a digital signal of 1 can also open or close. For the remainder of this discussion, it will be assumed that a digital signal of zero indicates that a valve should be closed, and that a digital signal of 1 means that a valve should be opened. The digital signal output for each signal in 250 is sent to a controller 260 wherein a digital to analog converter (DAC) outputs an analog signal corresponding to the digital signal for each channel read. Again, carrying on the assumptions made prior with respect to the digital signals, a zero volt analog signal will mean that a valve should be closed, and a 5 volt (or any analog voltage that the system will read as not a zero value, will mean that the valve should be open.) Correspondingly, in step 280, the appropriate valves will be turned on or off according to the analog signal outputted by the controller in step 260. In step 270, it is determined whether the control valve system requires a change of configuration of the serial port. Such a determination will be made based upon the initial configuration from step 210. If in step 270, it is determined that such a change configuration in the serial port needs to be made, then the method 200 will return to step 240. If there are no additional, changes to the configuration of the serial port, then the method 200 will end.

Figure 7:
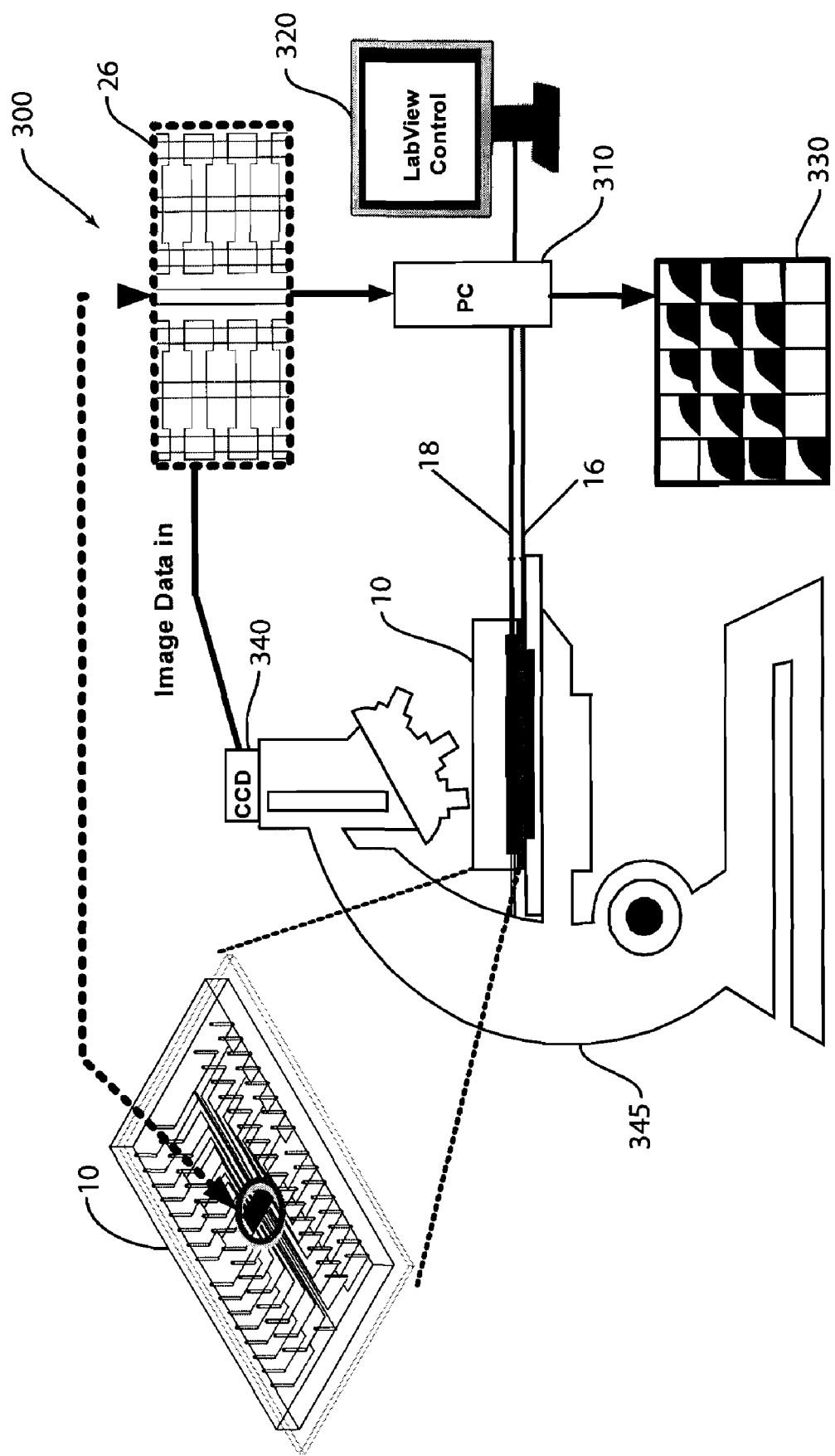
FIG. 7 illustrates a schematic diagram of a fluidic array system according to an embodiment of the present application.

Referring now to FIG. 7, a fluidic array system 300 of the present application is depicted. Here, a change coupled device (CCD) 340 is coupled to a viewing device 345 such as a microscope such that an image of the reaction chamber array 26 of the fluidic array chip 10 can be read and entered into a PC 310. The PC 310 includes a biochip reader and appropriate software for image analysis and image acquisition. Preferably, the Arrayworx® biochip reader from Applied Precision, LLC is utilized as a biochip reader application, and the preferred software for image analysis and acquisition is the Softworx Suite Version 2.5, also from Applied Precision, LLC. Of course, any biochip reader and software package configured to analyze the reaction chamber array 26 may be implemented and used.

Still referring to FIG. 7, the PC 310 also includes a processor, and is coupled to the control 320, wherein a user may utilize the method 200 as described in FIG. 6 to control the pressure system (not shown) used to operate the control layer 12 (not shown) of the fluidic array chip 10, and a system to provide the reagents or samples to the fluidic array chip 10 through the fluid flow channel 18. Again, the system of providing the reagents and samples are not pictured in FIG. 7. The PC 310 housing this processor and providing the control 320, is coupled with the fluidic array chip 10 by a main fluid flow channel 18, or set of main fluid flow channels 18, and a main control channel 16. Lastly, the PC 310 provides an output 330, which will be discussed in further detail with respect to FIGS. 8a and 8b.

Experimental Results

To demonstrate the efficacy of the microfluidic array chip and associated systems and methods of the present application, analysis of a phenotypic variation based on the metabolic preference of a carbon source was analyzed. Particularly, the difference in bacterial growth rate between a culture of *E.coli* bacteria was analyzed for a difference in growth rate through a comparison of wild type *E.coli* bacteria and lac Z knock-out mutant *E.coli* bacteria using the microfluidic array of the present application.

In an experiment, the fluid channels of a microfluidic array chip according to the present application were introduced with two samples: 1) wild type *E.coli* bacteria K-12 W3 110; and 2) *E.coli* bacteria lac Z knock-out mutant (ATCC 252254). The lac Z gene encodes the enzyme B-galactosidase. B-galactosidase converts lactose to galactose and glucose. It is necessary for bacteria, such as *E.coli*, to break complex sugars, such as lactose, into simple sugars, such as galactose and glucose for an energy source. Since the lac Z knock-out mutant *E.coli* strain cannot convert lactose to galactose or glucose, the lac Z knock-out mutant strain cannot use lactose as a source of energy. Accordingly, a comparison in growth rate of tagged wild-type and mutant *E.coli* cultures in selected growth media containing lactose and absent lactose may use to demonstrate efficacy of the present application.

The fluid channels of the microfluidic array, in addition to the samples noted above, also included the introduction of several growth media. The growth media included: 1) LB broth; 2) M9/0.2% glucose; 3) M9/0.04% glucose+0.2% lactose; and 4) M9/0.2% lactose. A comparison of *E.coli* growth between wild-type *E.coli* exposed to the M9/0.4% glucose+ 0.2% lactose versus the lac Z knock-out mutant *E.coli* in the same growth media may be accomplished using the technology of the present application.

Figure 8A:
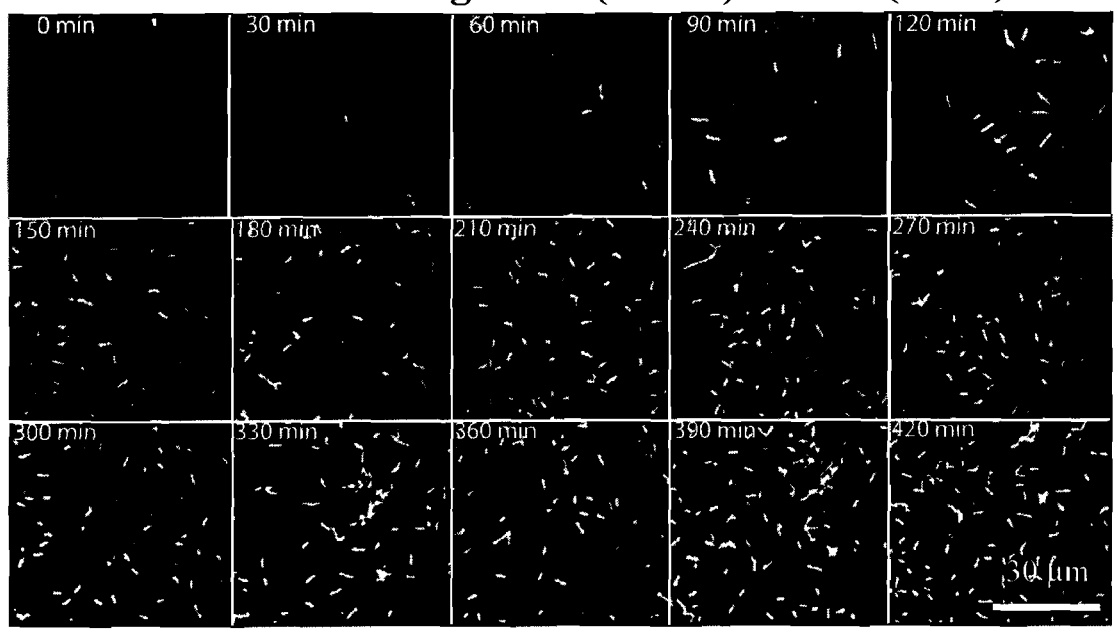
FIGS. 8a-8b illustrate exemplary output data of a fluidic array system according to an embodiment of the present application.
Figure 8B:
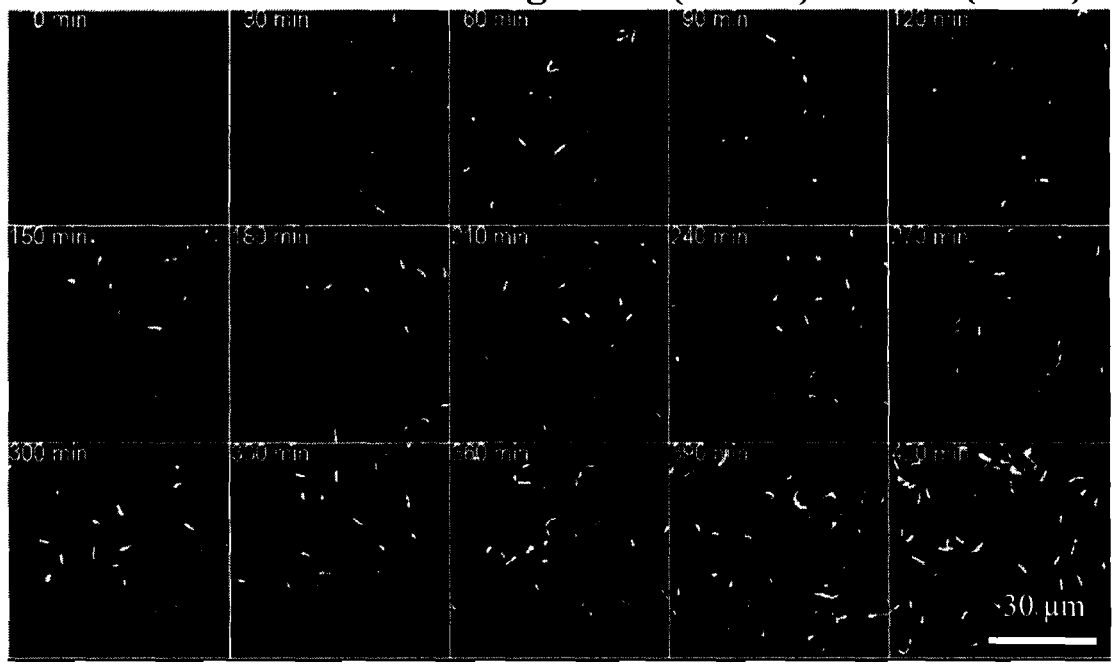

Referring now to FIGS. 8a and 8b, since the *E.coli* was tagged with an immunoflourescent tag, as the *E.coli* density grew, such density was recognizable through the charge-coupled device present in a conventional system as shown and previously described with respect to FIG. 7. A comparison of the graph of FIG. 8a to FIG. 8b demonstrates that after an elapsed time of 420 minutes, the density of *E.coli* colonies for the wild-type were substantially greater than the density of lac Z knock-out mutant when grown on a growth media of M9/0.04% glucose+0.2% lactose. This is due to the fact that the lac Z knock-out mutant cannot metabolize lactose as a carbon source and therefore can only use the glucose present in the growth media to generate colonies. In contrast, the wild-type colonies could metabolize both glucose and lactose and therefore demonstrated a more dense colony generation.

As demonstrated by the results of FIG. 8, the system of FIG. 7 utilizing the designs of the microfluidic chip as described elsewhere herein has substantial applications for biological, chemical, and biochemical experiments.

The present invention has been described in terms of specific embodiments incorporating details to facilitate the understanding of the principals of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A microfluidic array chip for biological, chemical, or biochemical assessments having a plurality of layers, the microfluidic array chip comprising:
   a fluidic layer comprising a plurality of fluid flow channels for delivery of selected reagents or samples, the fluid flow channels coupled to a chamber array, the chamber array comprising a plurality of reaction chambers; and
   a control layer comprising a plurality of control channels, wherein the fluidic layer and the control layer are coupled together such that the plurality of control channels form a valve system for the plurality of the fluid flow channels, and further wherein the chamber array portion further includes:
      a pair of side valves configured to allow the reagents or samples into a pair of delivery chambers when the side valves are open, wherein the side valves are each one of the plurality of control channels; and
      a center valve configured to separate the pair of delivery chambers when the center valve is closed, wherein the center valve is one of the plurality of control channels, wherein the reagents or samples are delivered to the pair of delivery chambers by a pair of delivery channels, further wherein the delivery channels are each one of the plurality of fluid flow channels, and further wherein the reagents or samples in each of the pair of delivery chambers are mixed when the pair of side valves are closed and the center valve is opened.

2. The chip of claim 1, wherein the valve system is pressure controlled such that when pressure is applied to any of the plurality of control channels, the control channels interact with the fluid flow channels to close one or more pre-selected fluid flow channels such that the valve system selectively controls the delivery of the reagents or samples from the plurality flow channels to the reaction chambers.

3. The chip as claimed in claim 1, further comprising a third layer coupled to the first layer of the fluidic array chip, the third layer including a plurality of samples, the third layer configured such that the samples may enter the plurality of reaction chambers through an opening in the plurality of reaction chambers, wherein the third layer and the first layer are coupled together.

4. The chip as claimed in claim 1, wherein the plurality of layers are fabricated utilizing any of the following methodologies:
   injection molding;
   pour molding; and
   laminating processes.

5. The chip as claimed in claim 3, wherein the plurality of layers are coupled together by a curing process.

6. The chip as claimed in claim 3, wherein the plurality of layers are fabricated from a silicon polymer.

7. The chip as claimed in claim 3, wherein the plurality of layers are fabricated from a teflon polymer.

8. The chip as claimed in claim 3, wherein the plurality of layers are fabricated from a perfluoropolyether.

9. The chip as claimed in claim 1, wherein the fluidic layer are fabricated from a combination of glass and polymer materials.

10. The chip as claimed in claim 1, wherein the plurality of control channels are operated with a pneumatic or hydraulic pressure system.

11. The chip as claimed in claim 2, wherein reactions produced in the plurality of reaction chambers are read by a micro-array scan.

12. The chip of claim 1, wherein the reagents or samples may include the following: eukaryotic cells, prokaryotic cells, yeasts, mamillian cells, stem cells, nucleotides, enzymes, proteins, carbohydrates, lipids, or constituent molecules thereof arranged for fluidic delivery; buffers; stimulants; and control liquids.

13. The chip as claimed in claim 1, wherein the plurality of reaction chambers in the chamber array are in a range of 10-10,0000 reaction chambers per square inch.

* * * * *